Figure 1:
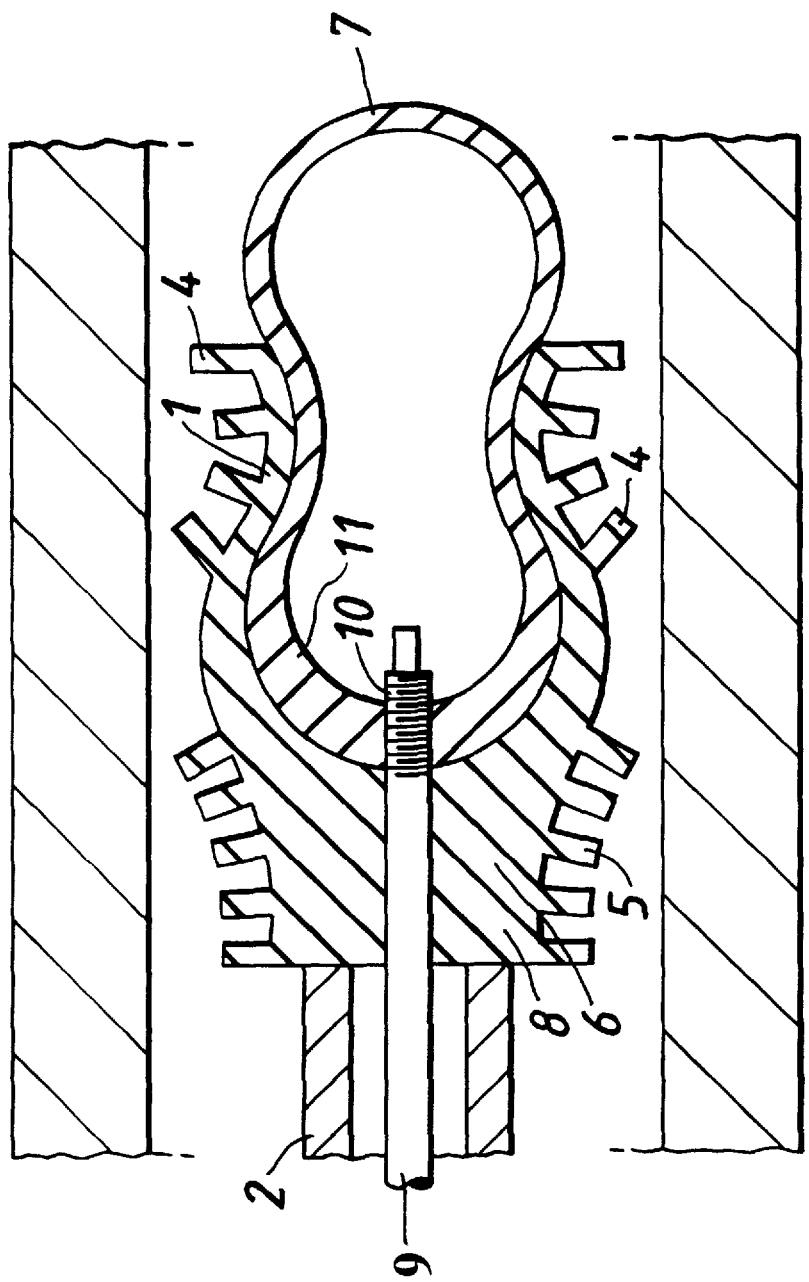

United States Patent

Sales et al.

[11] Patent Number: 5,878,784
[45] Date of Patent: Mar. 9, 1999

[54] PIPE BLOCKING TECHNIQUE

[75] Inventors: Brian Thomas Sales, Dorking; Anthony Dennis Elgar, Mitcham; Robert Neal Bennett, Hextable, all of Great Britain

[73] Assignee: British Gas plc, London, United Kingdom

[21] Appl. No.: 912,930

[22] Filed: Aug. 15, 1997

Related U.S. Application Data

[63] Continuation of Ser. No. 430,471, Apr. 28, 1995, abandoned.

[30] Foreign Application Priority Data

May 11, 1994 [GB] United Kingdom ............... 9409416

[51] Int. Cl.⁶ .................................................. F16L 55/128
[52] U.S. Cl. .................................................. 138/93; 138/89
[58] Field of Search ............................... 138/89, 93

[56] References Cited

U.S. PATENT DOCUMENTS

| | | | |
|---|---|---|---|
| 1,906,151 | 4/1933 | Goodman | 138/93 |
| 2,811,985 | 11/1957 | Wells | 138/93 |
| 3,310,615 | 3/1967 | Bender | 138/89 |
| 3,564,103 | 2/1971 | Brachschob et al. | 138/93 |
| 3,990,464 | 11/1976 | Jenkins | 138/93 |
| 4,013,097 | 3/1977 | Calandra | 138/93 |
| 4,245,970 | 1/1981 | St. Onge | 138/93 |
| 4,398,565 | 8/1983 | Williamson | |
| 4,436,120 | 3/1984 | Josien et al. | 138/93 |
| 4,627,470 | 12/1986 | Carruthers | 138/93 |
| 4,660,644 | 4/1987 | Egnor | 138/93 |
| 4,804,018 | 2/1989 | Carr et al. | 138/93 |
| 5,379,803 | 1/1995 | Elgar et al. | 138/89 |
| 5,400,826 | 3/1995 | Clough | 138/93 |
| 5,462,077 | 10/1995 | Cohen et al. | 138/93 |

FOREIGN PATENT DOCUMENTS

| | | |
|---|---|---|
| 0 368527 | 5/1990 | European Pat. Off. |
| 1 435352 | 5/1976 | United Kingdom |
| 2099541 | 12/1982 | United Kingdom |
| 2157390 | 10/1985 | United Kingdom |
| 2224802 | 5/1990 | United Kingdom |
| 2227071 | 7/1990 | United Kingdom |
| 2257766 | 8/1992 | United Kingdom |

*Primary Examiner*—Denise L. Ferensic
*Assistant Examiner*—James F. Hook
*Attorney, Agent, or Firm*—Oblon, Spivak, McClelland, Maier & Neustadt, P.C.

[57] ABSTRACT

A method for blocking the bore of a pipe comprising moving an inflatable bag along the bore of the pipe from an access point in the pipe to a point where the bore is to be blocked, inflating the bag until it engages the internal wall of the pipe or main and causing the bag to maintain its inflated condition. Where an expandable foam is used.

10 Claims, 6 Drawing Sheets

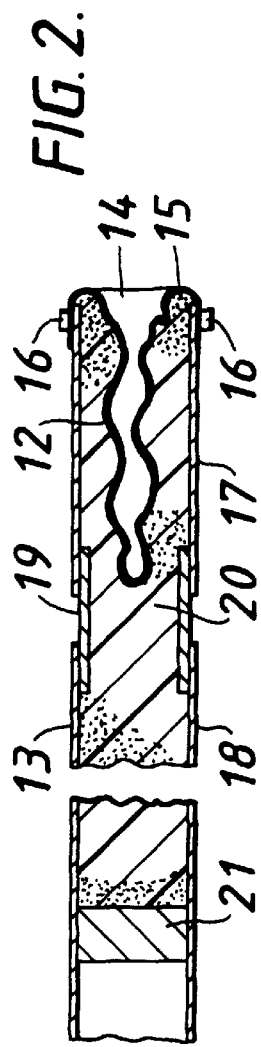
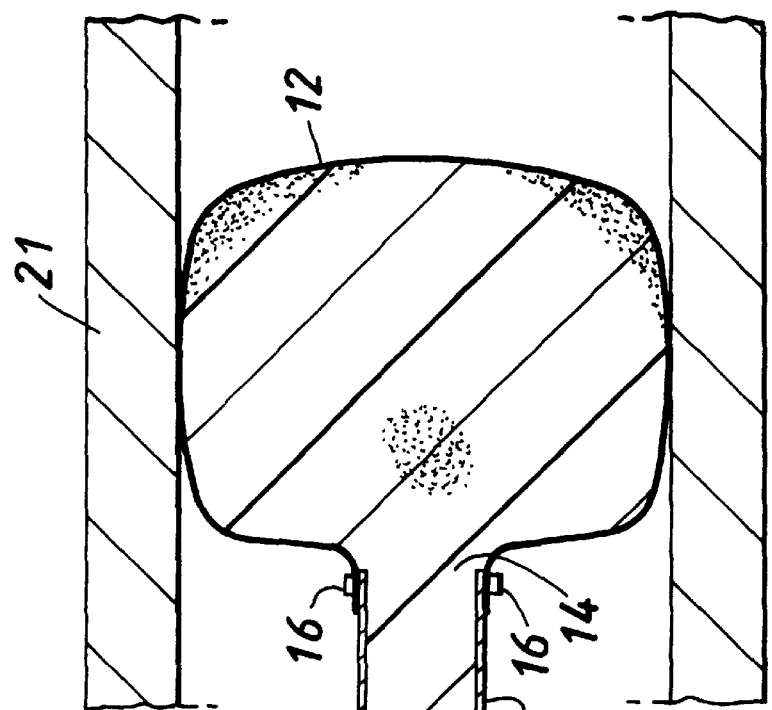

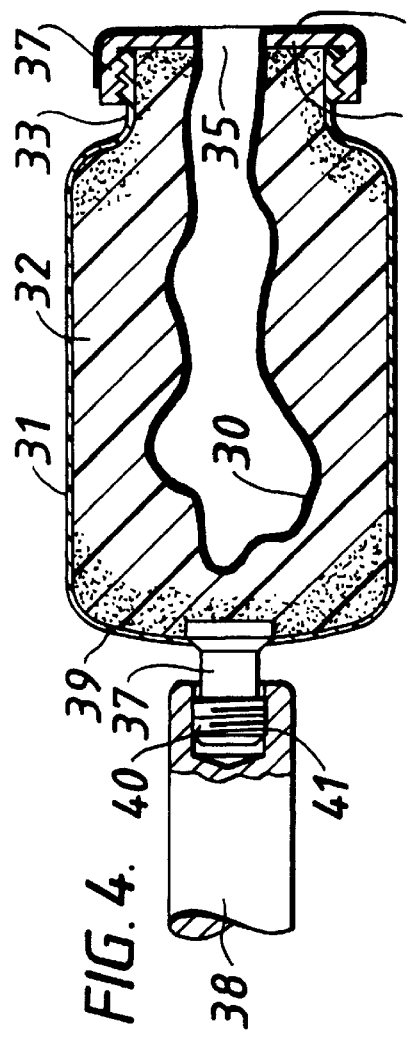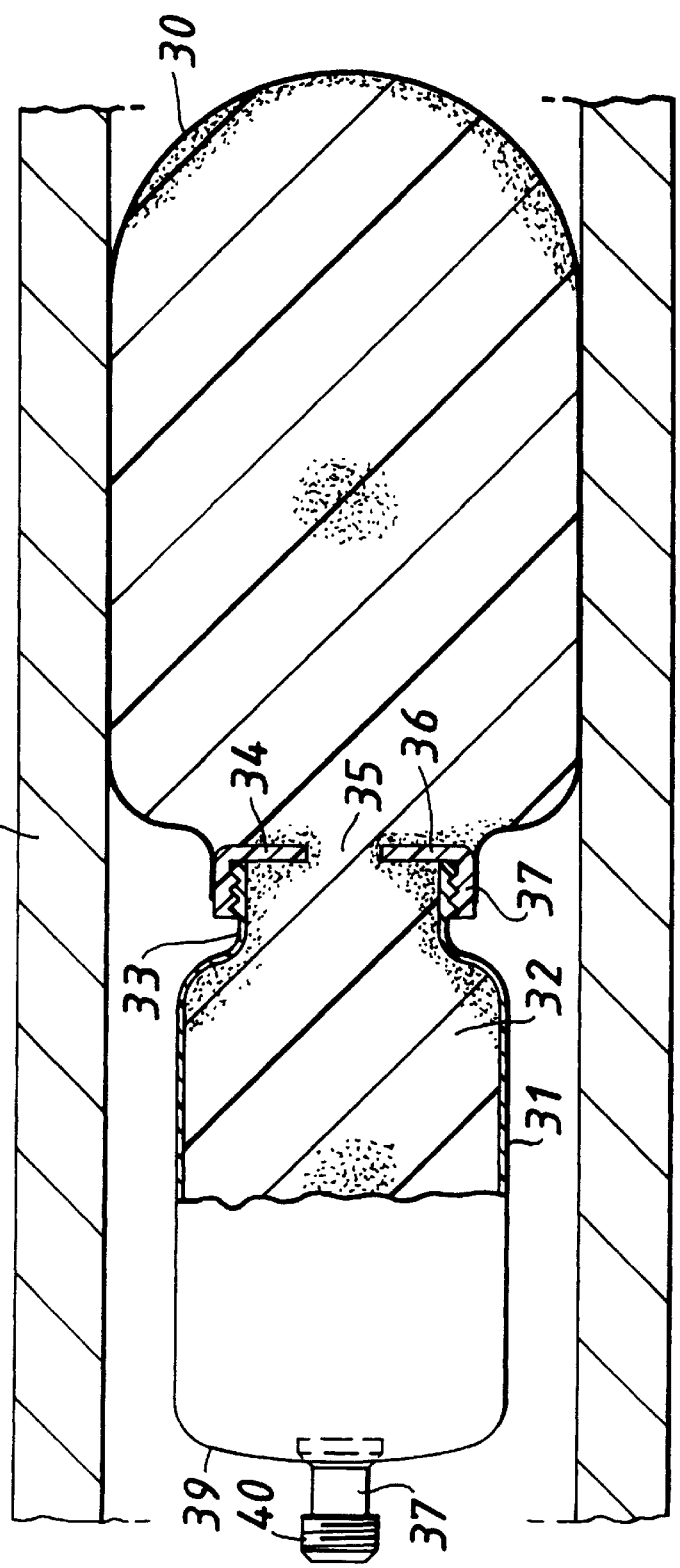

PIPE BLOCKING TECHNIQUE

This application is a Continuation of application Ser. No. 08/430,471, filed on Apr. 28, 1995, now abandoned.

The present invention relates to the blocking of the bore of a pipe and to a device for effecting such blockage.

The bores of gas, water and sewage pipes such as mains may need to be blocked when they are abandoned because they have developed leaks or for other reasons, e.g. their condition has deteriorated to such an extent that they are no longer safe. Leaks may develop at joints as a result of leak paths appearing within the joints in cast iron gas mains or as a result of cracks in the wall due to corrosion or mechanical damage in case iron and other materials, e.g. ductile iron and steel, cement, brickwork or plastics.

It is an object of the present invention to provide a method for blocking the bore of a pipe and a device for effecting such blockage.

According to a first aspect of the invention, we provide a method for blocking the bore of a pipe comprising moving an inflatable bag along the bore of the pipe from an access point in the pipe to a point where the bore is to be blocked and inflating the bag until it engages the internal wall of the pipe or main and causing the bag to maintain its inflated condition.

According to a second aspect of the invention, we provide a device for blocking the bore of a pipe or main comprising an inflatable bag for movement along the bore of the pipe from an access point in the pipe to a point where the bore is to be blocked, means for inflating the bag until it engages the internal wall of the pipe and means for moving the bag along the pipe or main to the point where the bore is to be blocked.

Figure 6:
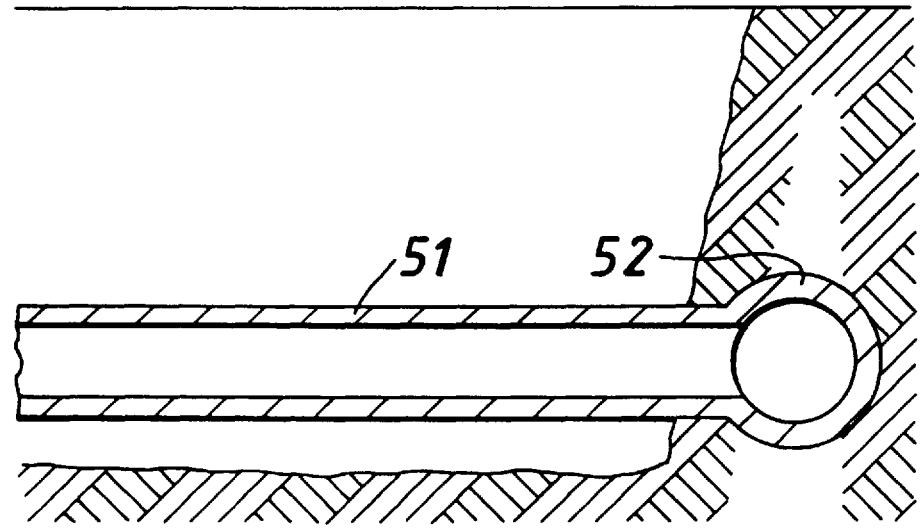
Figure 7:
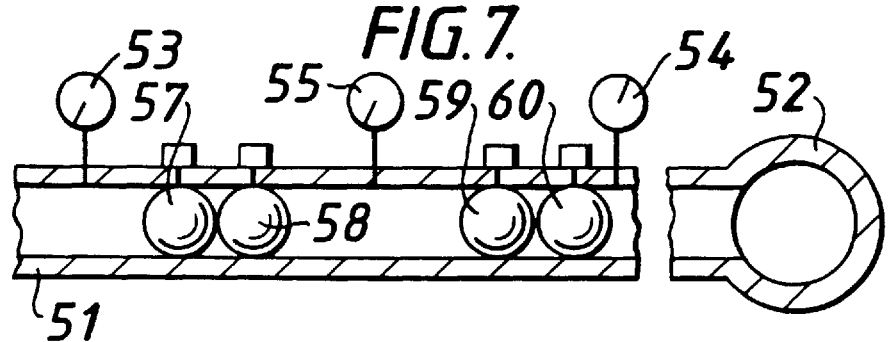
Figure 8:
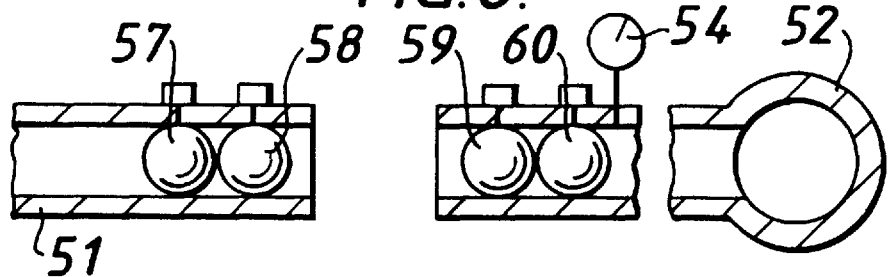
Figure 9:
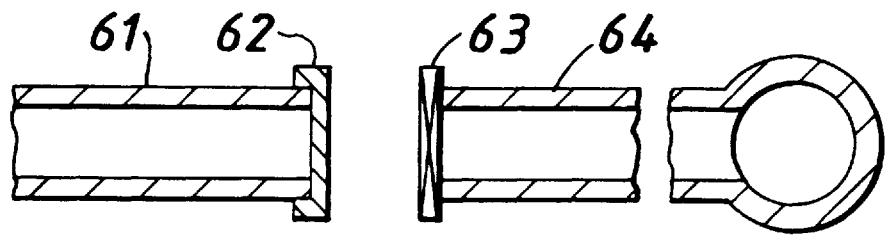
Figure 10:
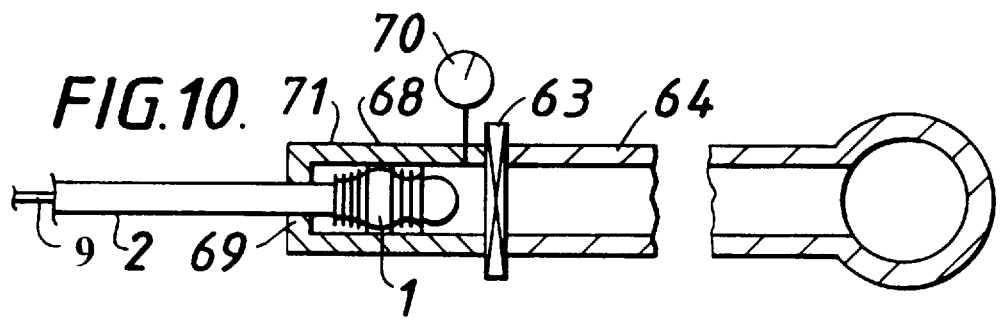
Figure 11:
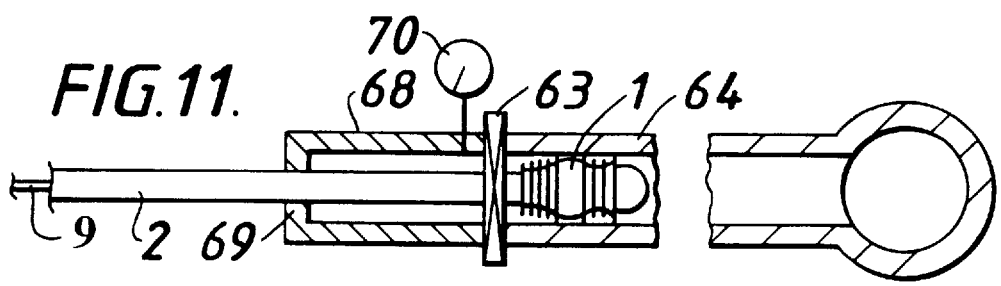
Figure 12:
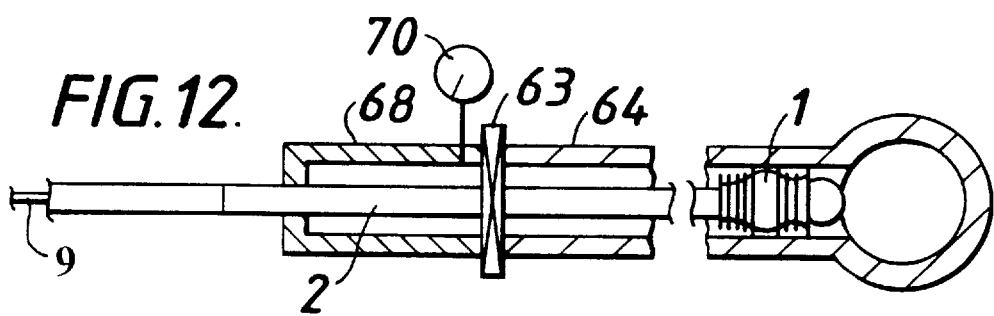
Figure 13:
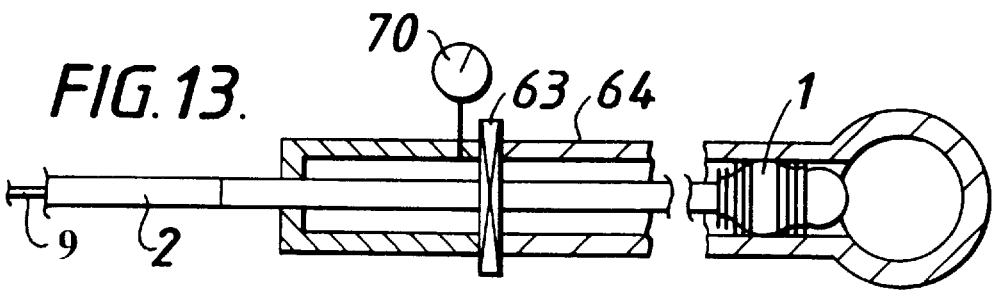
Figure 14:
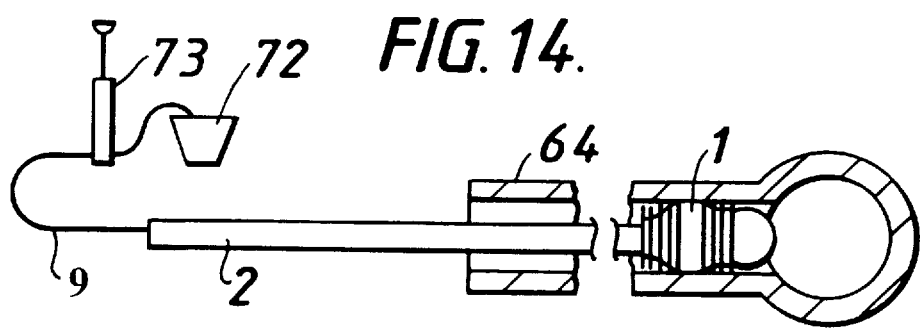
Figure 15:
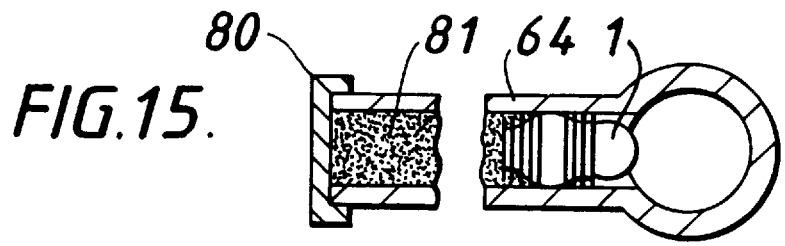

Embodiments of the invention will now be particularly described with reference to the accompanying drawings, in which:

FIG. 1 shows a longitudinal sectional view of a first embodiment of the invention, FIGS. 2 and 3 show a longitudinal sectional view of a second embodiment of the invention, FIG. 2 showing the bag before expansion and FIG. 3 showing the bag after expansion, FIGS. 4 and 5 show a longitudinal sectional view of a third embodiment of the invention, FIG. 4 showing the bag before expansion and FIG. 5 showing the bag after expansion, FIG. 6 shows a part length of a gas branch main joined to a spine feeder main, FIG. 7 shows the position after the bore of the branch main has been temporarily blocked to permit the removal of a first section therefrom, FIG. 8 shows the position after a first section of the branch main has been removed, FIG. 9 shows the position after a full-bore gate valve has been fitted to the spine-main distal end of a second section of the branch main, the adjoining end of the remainder of the branch main having been capped off, FIG. 10 shows the position after a gland box or pig trap has been connected to the valve with a bore blocking bag, FIG. 11 shows the position after the bag of FIG. 1 has been pushed through the open valve in the second section of the branch main, FIG. 12 shows the position before the bag is pushed into the spine main, FIG. 13 shows the position after the bag has been inflated, FIG. 14 shows the position after the valve and gland have been removed, the distal end of the second section of the branch main has been capped and a sealant has been injected into the void between the bag and the cap and allowed to set, and FIG. 15 shows the branch section totally abandoned and the section between the capped end and branch sealing device filled with a sealant/grout.

Referring to FIG. 1, a first embodiment of a device for blocking the bore of a pipe comprises an inflatable bag 1 connected by a releasable threaded connection (not shown) to a rigid or semi-rigid hollow rod 2 (shown more clearly in FIG. 13) which rod 2 can enable the bag 1 to be pushed along the pipe 3.

The bag 1 itself is of a flexible material such as rubber or synthetic rubber and has two spaced sets 4 and 5 of circumferential ribs to assist the bag 1 in gripping the internal wall of the pipe. The bag 1 may be inflatable with air but is in fact inflated with a flowable settable sealant such as an anaerobic sealant. The bag 1 comprises two portions, a rearward cup type portion 6 having the sets 4 and 5 of ribs and a forward balloon-type portion 7. A major part of the balloon portion 7 is sealed in and secured to the cup portion 6. The cup portion 6 has a thicker base portion 8 which is secured to the end of the rod 2.

Extending through the centre of the rod 2, and thence through the base 8 of the cup portion 6 and into the interior of the balloon 7 is a sealant injection tube 9. This is made of a flexible material, e.g. plastics and has a threaded connector portion 10 which is connected to a threaded aperture in the wall 11 of the balloon 7. This permits the tube 9 to be detached from the bag 1 after sealant has been injected into the balloon 7.

In FIGS. 2 and 3 there is shown a second embodiment of the device.

In this embodiment the device comprises an inflatable bag 12 connected to the end of a hollow flexible hose 13. The mouth 14 of the bag 12 which is in the form of a balloon is fitted over the outlet end 15 of the hose 13 and is secured to the hose 13 by a pair of diametrically opposed screws 16.

The hose 13 itself comprises an outlet portion 17 in which there is located the outlet end 15 of the hose 13, a main portion 18 upstream of the outlet portion 17 and a frangible liner 19 fitting inside the two portions 17 and 18 and secured to these members.

In use, before inflation, the bag 2 is inverted so that it is retained within the outlet end 15 of the hose 13 as shown in FIG. 12.

Next, a quantity of a two-part polymeric foam forming material 20 such as polyurethane, is poured into the hose 13 from the inlet end (not shown) and then a cylindrical plug 21 is inserted to a position close to the outlet end 15 of the hose 13 to prevent the expansion of the foam back up the hose 13.

The polymer mix comprises two components, a monomer and an accelerator, and these and their proportions are selected so that there is a delay between the introduction of the mix into the hose 13 and its expansion to inflate the bag 12 in order to block the pipe 21 as shown in FIG. 3. This delay permits the hose 13 to be fed from an access point in the pipe 21 to the point where the bore is to be blocked as shown in FIG. 2.

After the foam has expanded and set, the hose 13 is pulled sufficiently hard to break the frangible liner 19 and permit the main portion 18 of the hose 13 to be pulled out of the pipe 21 leaving the expanded bag 12 behind blocking the bore of the pipe 21.

Referring to FIGS. 4 and 5 there is shown a third embodiment of the device.

In this embodiment, the device comprises an inflatable bag 30 in the form of a balloon connected to a container 31 which, in use, contains a quantity of a polymeric foam-forming material 32 of the type previously described with reference to FIGS. 2 and 3.

The container 31 is in the form of a plastic bottle with a neck 33 over which is fitted the bag 30. A plastic cap 34 is screwed onto the bottle neck 33 which is externally threaded for the purpose. The cap 34 has an aperture 35 in its head 36 to permit foam to escape from the bottle 31 into the balloon 30. As shown the balloon is fitted over the head 36 and skirt 37 of the cap 34 and is secured to the cap 34 by means of an adhesive, e.g. an anaerobic type superglue.

A connector 37 for connecting the bottle 31 to a rod 38 is secured to the base 39 of the bottle 31 as shown in FIG. 4. The connector 37 has a threaded male portion 40 for detachable connection to a corresponding threaded female portion 41 on the rod 38 whereby after the rod 38 has pushed the balloon 30 and bottle 31 to the point where the pipe 1 is to be blocked and the balloon 30 has been inflated to block the bore of the pipe 41 as shown in FIG. 5, the rod 38 may be unscrewed from the connector 37 and removed from the pipe 41.

The external diameter of the bottle 31 is smaller than the internal diameter of the pipe 41 to permit it to be pushed freely along the pipe 41.

In use, the balloon 30 is inverted, fitted over the cap 34 and fastened thereto with the major portion of the balloon 30 extending through the aperture 35 in the head 36 of the cap 34.

Next, the bottle 30 is filled with a foam polymer mix similar to the previously described. The balloon 30 is pushed into the mix and the cap 34 screwed onto the bottle neck 33 as shown in FIG. 4.

The bottle 30 is then pushed along the bore of the pipe 41 by means of the rod 38 until the point where the pipe bore is to be blocked is reached as shown in FIG. 5.

After a delay the foam reactants react together and the foam forms and expands to inflate the balloon 30 until it engages with and forms a tight sealing fit against the internal wall of the pipe 41.

The rod 38 is then unscrewed from the connector 37 and withdrawn from the pipe 41 to leave the bottle 31 and balloon 30 behind.

FIGS. 6 to 15 show in sequence the various steps in the method using the bag of FIG. 1. In FIG. 6 a branch main 51 is joined to a larger diameter spine main 52. The spine main 52 may be carrying gas, water or sewage although the invention is particularly suitable for the abandonment of gas carrying mains. The spine main 52 may be a district feeder main, the branch main 51 supplying gas via service pipe offtakes (not shown) at the other end of the branch main 52. In a first step in the method (FIG. 6), a length of the branch main 51 remote from the spine main 52 is exposed by excavation. The location of the excavated length may be in an area where excavation and re-instatement costs are low, i.e. where disruption to pedestrians and traffic is a minimum.

A previous part disconnection may have already been undertaken and the branch section capped at this point.

Conventional pressure gauges 53 and 54 are connected by known techniques at spaced apart positions to the branch main 51. The gauges indicate the pressure of the gas at the connection points (FIG. 7).

In the next step of the method a pressure gauge 55 is connected between the gauges 53 and 54 and a section of pipe including the gauge 55 is sealed off from the flow of gas by the known technique of 'bagging off'. Here two pairs of removable inflatable rubber bags 57, 58 and 59, 60 respectively are inserted into the main 51 at spaced apart positions and are inflated as shown temporarily to block the bore of the main 51. Where the branch connection has already been part disconnected the use of one set of removable inflatable bags may be sufficient. The effectiveness of the blockage can be observed from the pressure readings on the gauges 55 and 53 which should be zero if the blockage is effective.

In the next step of the method (FIG. 8) a section of the main 51 lying between the bag 58 and the bag 59 is then removed by known techniques including sawing, this section then constituting the 'first section' of the branch main while the section still united to the spine main 52 is the 'second section' of main 51. Removal of the first section permits access to be gained to the bore of the main 51 via the free end of the second section. The pressure gauges 53 and 55 are also removed and any hole necessary for their connection is plugged or sealed.

Next (FIG. 9) the end of the remote remainder 61 of the branch main 51 is capped off by a conventional end cap 62. The bags 57 and 58 are then deflated and removed through their insertion holes which may be plugged or sealed as conventional. Finally, the gauge 54 is removed.

A full bore known-type gate valve 63 is then connected as shown to the distal access end of the second section 64 of the branch main 51 and with the valve 63 closed the bags 59 and 60 are deflated and removed through their insertion holes which are plugged or sealed as conventional.

However, if inflatable by air the bag 16 would have a non-return valve to prevent the escape of air once inside the bag 16. A suitable source of air is compressed air.

Referring to FIG. 10 the bag 1 is initially housed within a known-type gland box or pig trap 68. The gland box 68 has an entry wall 69 formed of elastomeric components which form a hole through which the hose 2 may be inserted, the edge forming the hole providing a flexible seal for the outer wall of the rod 2. In this case the bag 1 is inflatable with a flowable settable sealant supplied from a reservoir via the hose 7.

The gland box 68 is connected to the valve 63 but prior to this, the rod 2 is inserted through the hole in the gland wall 69 so that the bag 1 is located within the gland box 68 as shown and previously mentioned. The seal between the gland box 68 and the rod 2 is effective in preventing gas escaping through the gland wall 69 when the valve 63 is opened. A pressure gauge 70 is as shown connected to a side wall 71 of the gland box 68 to indicate the pressure within the gland box 68. The rod 2 can be an integral length or comprise individual short sections connected by screw threads or snap couplings.

Referring to FIG. 11, in the next stage of the method, the valve 63 is opened and the bag 1 is pushed from the gland box 68 into the section 64 of the main 1.

The bag 1 is pushed further until it reaches the position shown in FIG. 12, i.e. adjacent to the junction. This is determined by previous measurement, with a rigid rod and a closed circuit television camera.

When the bag 1 is in the correct position in the section 64 of the pipe, it is inflated (FIG. 13) to engage the internal wall of the pipe to form a seal therewith and block the bore of the pipe to the passage of gas and other fluids. In this case the bag 1 is inflated by a settable liquid sealant which is pumped to the bag 1 along the hose 7. The sealant is supplied from a reservoir 72 via a hand pump 73 (FIG. 14).

The hose 7 and rod 2 are then removed from the pipe and the gland box 68 and valve 63 are removed and a known type end cap 80 is fitted to the end of the pipe, there being a solid fluid tight seal between the bag 1 and the end cap 80.

Regarding the embodiments of FIGS. 2 and 3, and 4 and 5 the method steps of FIGS. 6 to 13 are followed but then the bags are expanded by foam rather than a settable sealant pumped to the bag.

As shown in FIG. 15 the void between the end cap 80 and the bag 1 is totally filled with a sealant 81, injected under pressure through an aperture (not shown) in the end cap 80.

The bag 1 may be formed of porous foam rather than rubber or synthetic rubber.

In addition instead of being inflated with sealant the bag may be inflated with air as already stated. Where a sealant is used instead it may be a water based cementitious grout, cement or a glue of an epoxy or anaerobic kind as well as a suitable foamed plastic. After injection the sealant is allowed to cure so that the blockage of the bore of the pipe section 64 is permanent.

We claim:

1. A device for blocking the bore of a pipe or main, comprising:
    a reservoir containing an expandable material,
    an inflatable bag stored in the reservoir in an inverted state and closing off an open end of the reservoir, and
    an insertion element detachably connected to the reservoir for moving reservoir and the bag along the pipe or main from an access point in the pipe to the point where the bore is to be blocked.

2. The device of claim 1, wherein the material is a flowable polymeric foam.

3. The device of claim 1 wherein the insertion element is a pipe.

4. The device of claim 1 wherein the insertion element is a rod.

5. A method for blocking the bore of a pipe, comprising the steps of:
    storing, in a reservoir, an expandable material and an inverted inflatable bag;
    using an inserting element connected to the reservoir to move the reservoir containing the expandable material and the inverted inflatable bag along the bore of the pipe from an access point in the pipe to a point where the bore is to be blocked;
    inflating the bag using the expandable material until the bag engages the internal wall of the pipe;
    maintaining the inflated bag engaged against the internal wall of the pipe so as to block the pipe;
    detaching the inserting element from the reservoir; and
    removing the inserting element from the pipe while the bag remains in the pipe.

6. The method of claim 5, wherein the material is a flowable polymeric foam.

7. The method of claim 5 including the step of sealing the bore of the pipe independently of the inflated bag by introducing a flowable settable material into a portion of the bore of the pipe between the access point and the inflated bag, after the step of removing the inserting element from the pipe.

8. A method for blocking the bore of a pipe, comprising the steps of:
    storing, in a reservoir, a bag and an expandable and settable material;
    using an inserting element to move the reservoir containing the expandable and settable material along the bore of the pipe from an access point in the pipe to a point where the bore is to be blocked;
    inflating the bag by setting the expandable and settable material until the bag engages the internal wall of the pipe;
    maintaining the inflated bag engaged against the internal wall of the pipe so as to block the pipe;
    detaching the inserting element from the bag so as to expose the set material;
    removing the inserting element from the pipe while the bag remains in the pipe; and
    sealing the bore of the pipe independently of the inflated bag by introducing a flowable settable material into a portion of the bore of the pipe between the access point and the inflated bag, after the step of removing the inserting element from the pipe.

9. The device of claim 8, wherein the material is a flowable polymeric foam.

10. A method for blocking the bore of a pipe comprising the steps of:
    moving an inflatable bag along the bore of the pipe from an access point in the pipe to a point where the bore is to be blocked; and inflating the bag until it engages the internal wall of the pipe by injecting a flowable settable sealant into the bag via a hose connected to the bag and which moves along the pipe together with the bag;
    causing the bag to maintain its inflated condition;
    disconnecting the hose from the bag after the bag has been inflated;
    removing the hose from the bore of the pipe; and
    introducing a flowable settable material into that position of the bore of the pipe lying between the bag and the access point to cause a further blockage independently of the bag.

* * * * *